(12) United States Patent
Sterk (10) Patent No.: US 7,696,714 B2
(45) Date of Patent: Apr. 13, 2010

(54) METHOD AND APPARATUS FOR ACTIVE NOISE REDUCTION IN FANS

(75) Inventor: Tom P. Sterk, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 407 days.

(21) Appl. No.: 11/737,372

(22) Filed: Apr. 19, 2007

(65) Prior Publication Data

US 2008/0260361 A1    Oct. 23, 2008

(51) Int. Cl.
*H02P 23/00* (2006.01)
(52) U.S. Cl. .................. 318/798; 318/801; 318/432
(58) Field of Classification Search ............ 318/800, 318/798, 801, 802, 459, 432
See application file for complete search history.

(56) References Cited

U.S. PATENT DOCUMENTS 4,920,475 A * 4/1990 Rippel ..................... 363/132
6,906,503 B2 * 6/2005 Lopez-Santillana et al. . 323/283

* cited by examiner

*Primary Examiner*—Rina I Duda
(74) *Attorney, Agent, or Firm*—Williams, Morgan & Amerson, PC (57) ABSTRACT

The present invention provides a method and apparatus for providing power to a fan motor. One embodiment of the apparatus includes a boost regulator configured to provide an output current to a fan motor using an input current provided at an input voltage by a power supply. The fan motor is configured to draw the output current at a first frequency and the input current is constant within a first selected tolerance over a time scale longer than indicated by the first frequency.

23 Claims, 9 Drawing Sheets

METHOD AND APPARATUS FOR ACTIVE NOISE REDUCTION IN FANS

BACKGROUND OF THE INVENTION

1. Field of the Invention

This invention relates generally to communication systems, and, more particularly, to fans used in communication systems.

2. Description of the Related Art

Communication equipment such as base stations, network controllers, switching centers, routers, and the like generate heat when electrical current is dissipated within the equipment. Consequently, most communication equipment includes one or more fans that are used to cool the equipment to maintain a selected operating temperature or range of temperatures. The fans are typically powered by one or more direct current (DC) motors to draw power from a power supply, such as a 48 V power supply. The fan motors usually have two poles and so the fan motor draws two pulses of DC current from the power supply for each revolution of the fan. Depending on the angular frequency of the fan, the current pulse rate for fan motors that are used in communication equipment usually varies between about 100 and 300 Hz, although in some cases the current pulse rate can fall outside of this range.

The current pulses drawn by the fan motor can generate electrical noise at the current pulse frequency and at the harmonics of the pulse frequency. The noise produced by these current pulses can couple onto the 48 V power supply and then be transferred directly on to any communication lines that are connected to the communication equipment including the fan motor. For example, in applications where plain old telephone service (POTS) is employed, the current pulse noise can couple onto the 48 V power supply and then directly onto the POTS lines that carry communication signals. The electrical noise produced by the current pulses can affect the audible noise perceived by a person that is using telephone equipment that is coupled to the communication lines, particularly if the electrical noise has a frequency that falls between about 300 Hz and 4 kHz. Thus, harmonics of the current pulse frequency may produce audible noise in a POTS communication system, as well as in other communication systems. Consequently, service providers have set very stringent requirements on the amount of electrical noise that can be produced by a fan motor used in communication equipment. For example, in a POTS system, the psophometric noise must be less than 0.4 mV.

Meeting these requirements on the amount of electrical noise produced by a fan motor that can couple to the 48 V power supply has been problematic for at least two reasons. First, since the frequency of the current pulses and/or harmonics of the current pulse frequencies can follow the audio range used by indications systems such as POTS communication systems, the tolerable level of noise is very low, which results in even more stringent limitations on the amount of acceptable noise that can be produced by a fan motor. Second, the relatively low-frequency electrical noise produced by the fan motors requires relatively large passive filters to achieve sufficient attenuation to meet the noise requirements. Often times, fan manufacturers do not appreciate the effort needed to meet the noise requirements until a prototype of the fan has been designed, built, and tested. Consequently, the design of the fan may not include sufficient room to accommodate the required large filter components, which may result in significant additional costs for re-design, re-testing, and/or re-production of the fans.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, an apparatus is provided for powering a fan motor. One embodiment of the apparatus includes a boost regulator configured to provide an output current to a fan motor using an input current provided at an input voltage by a power supply. The fan motor is configured to draw the output current at a first frequency and the input current is constant within a first selected tolerance over a time scale longer than indicated by the first frequency.

In another embodiment of the present invention, a method is provided for powering a fan motor. One embodiment of the method includes providing an output current to a fan motor using an input current provided at an input voltage. The fan motor is configured to draw the output current at a first frequency and the input current is constant within a first selected tolerance over a time scale longer than indicated by the first frequency.

In yet another embodiment of the present invention, a fan is provided. One embodiment of the fan includes a power supply configured to provide an input current at an input voltage and a fan motor configured to draw an output current at a first frequency. The output current is provided by the power supply. The fan also includes a boost regulator coupled between the power supply and the fan motor. The boost regulator is configured such that the input current is constant within a first selected tolerance over a time scale longer than indicated by the first frequency.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
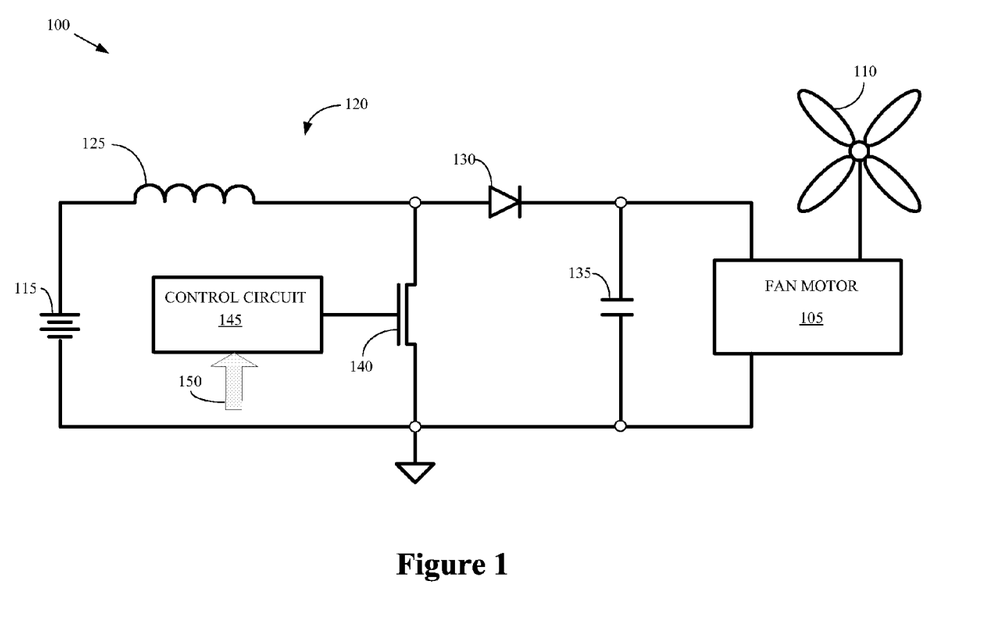
FIG. 1 conceptually illustrates one exemplary embodiment of a fan, in accordance with the present invention.

FIG. 1 conceptually illustrates one exemplary embodiment of a fan 100. In the illustrated embodiment, the fan 100 includes a fan motor 105 that is used to turn the fan blades 110. Power supply 115 is a direct current source that is used to provide current to power the fan motor 105. The fan motor 105 has two poles and so the fan motor 105 draws two pulses of DC current from the power supply 115 for each revolution of the fan blades 110. Consequently, the current provided to the fan motor 105 pulses with a frequency that is related to the angular frequency of the fan blades 110. However, persons of ordinary skill in the art having benefit of the present disclosure should appreciate that the present invention is not limited to this particular embodiment of the fan 100. In alternative embodiments, other types of fan motor 105 having a different number of poles may also be implemented in the fan 100.

The fan 100 also includes a boost regulator (or boost converter) 120. In the illustrated embodiment, the boost regulator 120 includes an inductor 125, a diode 130, a capacitor 135, and a transistor 140. The transistor 140 shown in FIG. 1 is a MOSFET. However, persons of ordinary skill in the art having benefit of the present disclosure should appreciate that any type of transistor may be used in alternative embodiments of the present invention. The inductor 125 functions as an input to the boost regulator 120 and the capacitor 135 functions as the output of the boost regulator 120. Inductors typically provide a relatively constant current and capacitors typically provide a relatively stable output voltage while providing current pulses. Thus, the topology of the boost regulator 120 is well-suited for providing relatively constant input currents while allowing the output to provide current pulses to the fan motor 105. The values of the inductance of the inductor 125 and/or the capacitance of the capacitor 140 may be selected based upon parameters of the fan motor 105, or any other criteria. In various alternative embodiments, the capacitance may be selected based on parameters of the fan 100 such as the desired variation in the output voltage, the fan speed or a range of fan speeds, the desired output current drawn by the fan motor 105, and the like.

The boost regulator 120 also includes a control circuit 145 that may be used to provide a control signal to the gate of the transistor 140. In one embodiment, the control circuit 145 receives feedback 150 from one or more portions of the boost regulator 120. For example, the feedback 150 may be a signal indicative of the amplitude of the current through the transistor 140. The control circuit 145 may then use the feedback 150 to determine when to provide signals that turn on or turn off the transistor 140. For example, the control circuit 145 may use the feedback 150 to determine a frequency of the signal provided to the gate of the transistor 140 so that the input current provided by the power supply 115 is approximately constant, as will be discussed in detail herein.

The power supply 115 provides current to the boost regulator 120 at a selected voltage and the fan motor 105 is coupled to the boost regulator 120 in parallel with the capacitor 135. Thus, the fan motor 105 draws an output current from the boost regulator 110 and the output current is formed from the input current provided by the power supply 115. The fan motor 105 draws the output current at the output current pulse frequency (e.g., the frequency determined by the angular frequency of the fan blades 110) and the boost regulator 120 is configured to provide the output current to the fan motor 105 by drawing an input current from the power supply 115. The parameters of the boost regulator 120, and the signals provided by the control circuit 145, may be adjusted so that the input voltage and input current are substantially constant in time. As used herein, the term "substantially constant" will be understood to refer to a current that is constant within a selected tolerance over a time scale longer than indicated by the first frequency. For example, the input current fluctuations may be required to be within a tolerance that corresponds to a psophometric noise level of less than 0.4 mV.

Figure 2:
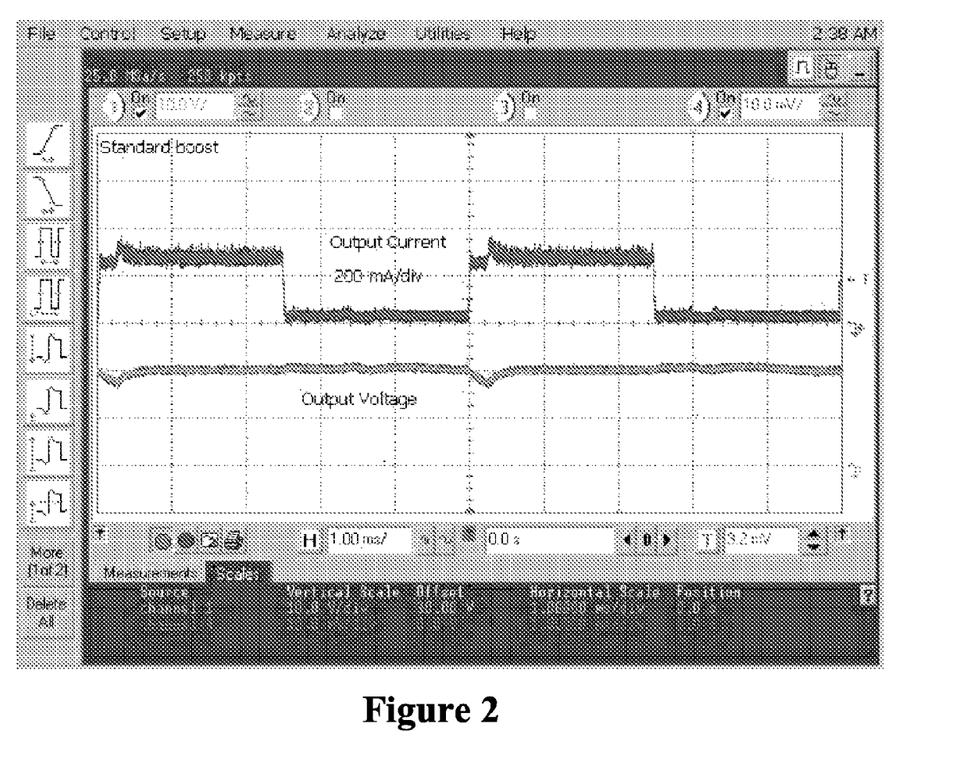
FIG. 2 illustrates an output current and an output voltage provided by a first embodiment of a boost regulator.

FIG. 2 illustrates an output current and an output voltage provided by a first embodiment of a boost regulator, such as the boost regulator 120 shown in FIG. 1. In the illustrated embodiment, the output current and output voltage are shown for a boost regulator circuit that has a 20 volt output and a load that is pulsed from 0.05 to 0.3 amperes. The input voltage to the boost regulator is approximately 12 V. The top trace in the figure is the output current and the lower trace is the output voltage. The output capacitance of the boost regulator is approximately 20 µF. FIG. 2 shows that the change in the load current causes a change in the output voltage of about 3 V, which the boost regulator loop quickly corrects.

Figure 3:
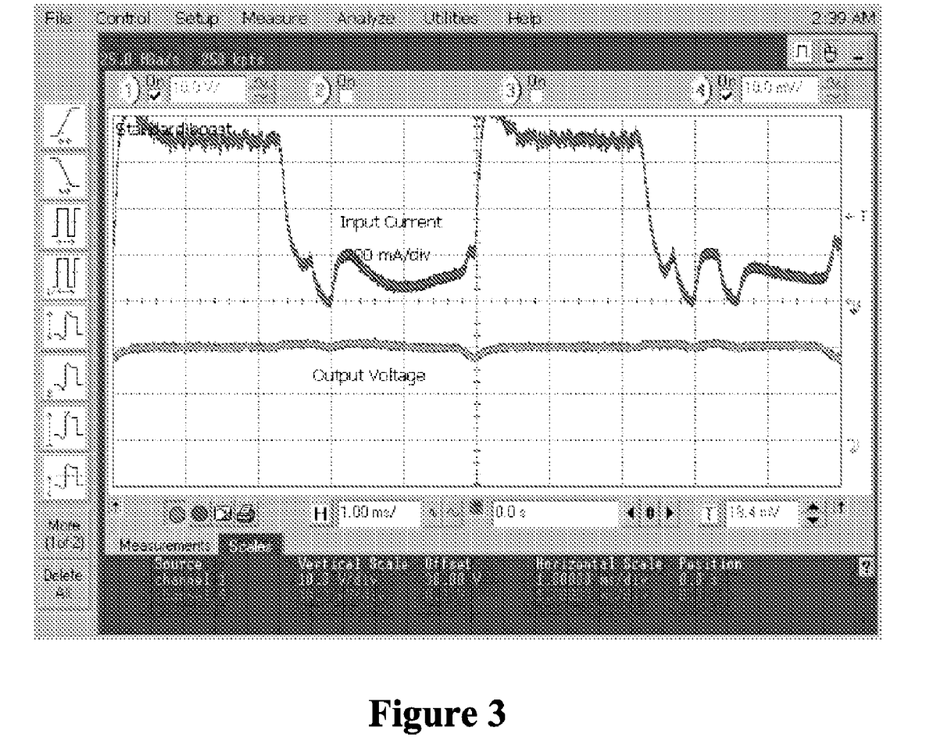
FIG. 3 illustrates an input current from a power supply and the output voltage provided by the first embodiment of the boost regulator.

FIG. 3 illustrates an input current from a power supply and the output voltage provided by the first embodiment of the boost regulator that was used to form the traces shown in FIG.

2. The input current is from the power supply to an inductor in the boost regulator, e.g., from the power supply 115 to the inductor 125 shown in FIG. 1. Although the output voltage provided by the boost regulator is approximately constant over a timescale that is much larger than the frequency of the output current draw, the input current varies significantly at the frequency of the output current draw. The variation in the input current may generate noise that could affect the quality of audio signals transmitted by systems that include the boost regulator. Accordingly, the first embodiment of the boost regulator may be modified to attenuate these variations.

Figure 4:
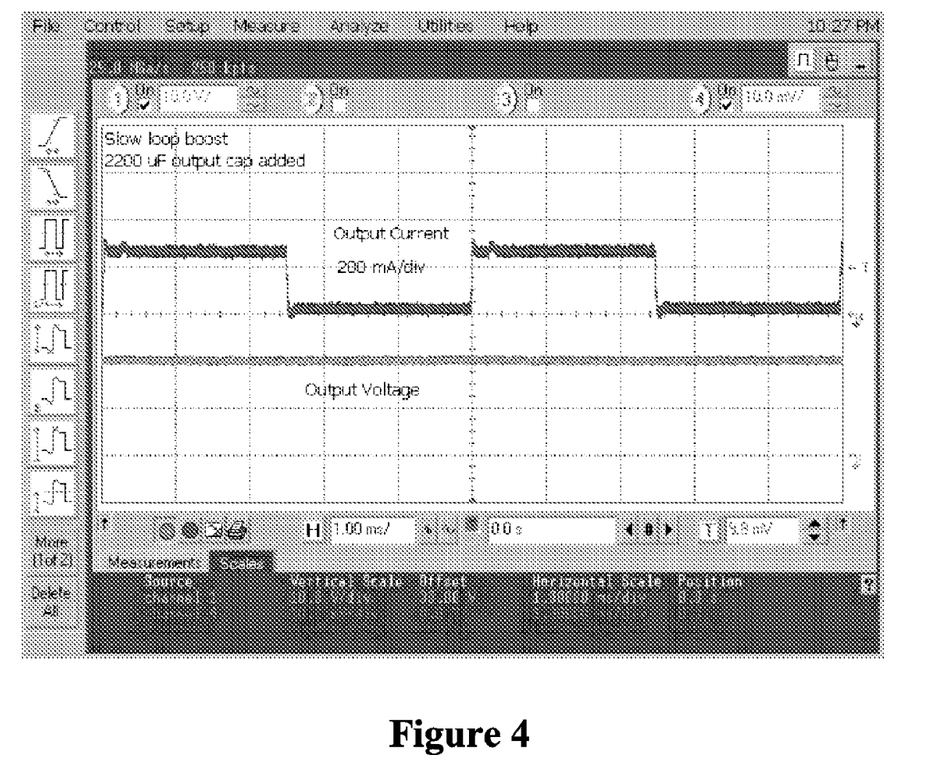
FIG. 4 illustrates an output current and an output voltage provided by a second embodiment of a boost regulator, in accordance with the present invention.

FIG. 4 illustrates an output current and an output voltage provided by a second embodiment of a boost regulator. Compared to the embodiment used to form the traces shown in FIGS. 2 and 3, the second embodiment of the boost regulator circuit, which produces the traces shown in FIG. 4, has a relatively large output capacitor that has a capacitance of about 2200 µF. The regulation loop of the second embodiment of the boost regulator circuit has also been slowed down relative to the first embodiment of the boost regulator circuit. This may be achieved by implementing a control circuit that supplies signals to the transistor gate at a relatively low frequency compared to the first embodiment of the boost regulator circuit. In the illustrated embodiment, the closed-loop bandwidth is less than 10 Hz. At least in part due to the increase in the capacitance, the output voltage trace shown in FIG. 4 is much more stable (relative to the first exemplary embodiment of the boost regulator circuit) for the same pulsed current. The closed-loop bandwidth is reduced in the second exemplary embodiment of the boost regulator circuit and the output voltage variation is also substantially reduced because of the increase in the capacitance. The output current continues to pulse at the frequency of the output current draw.

Figure 5:
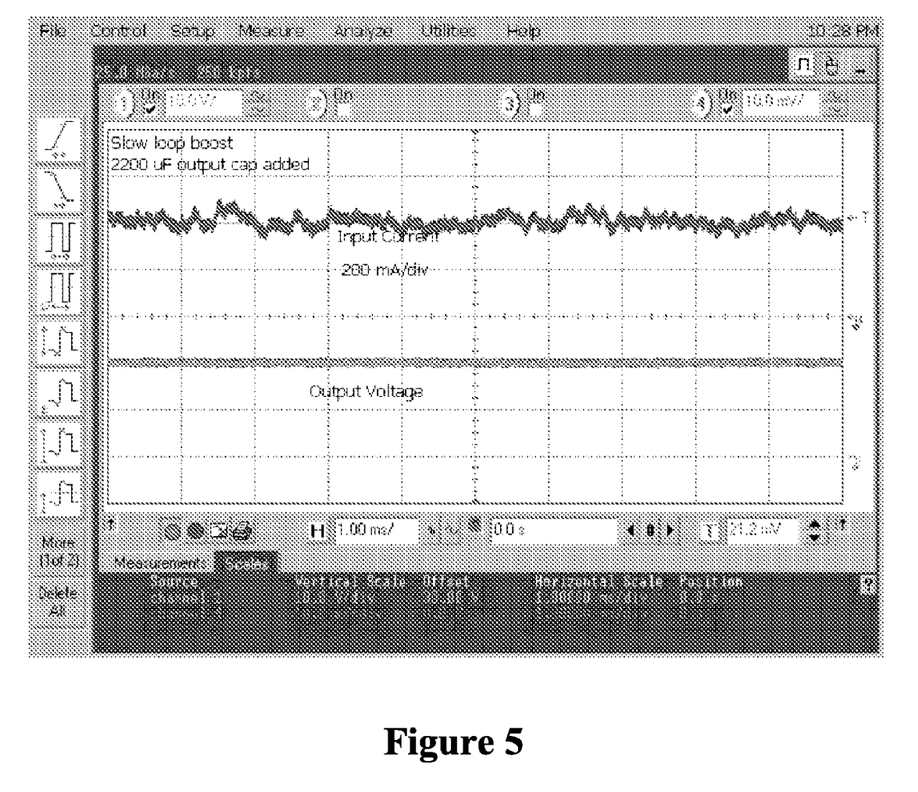
FIG. 5 illustrates an input current from a power supply and the output voltage provided by the second embodiment of the boost regulator, in accordance with the present invention.

FIG. 5 illustrates an input current from a power supply and the output voltage provided by the second embodiment of the boost regulator. The input current is from the power supply to an inductor in the boost regulator, e.g., from the power supply 115 to the inductor 125 shown in FIG. 1. In the illustrated embodiment, the output voltage remains substantially constant and the input current provided by the power supply has also been regulated so that it shows almost no periodic variation at the frequency of the output current draw. Although some noise can be seen in the input current trace, the amplitude of the noise is a small fraction of the variation in the output current.

Figure 6:
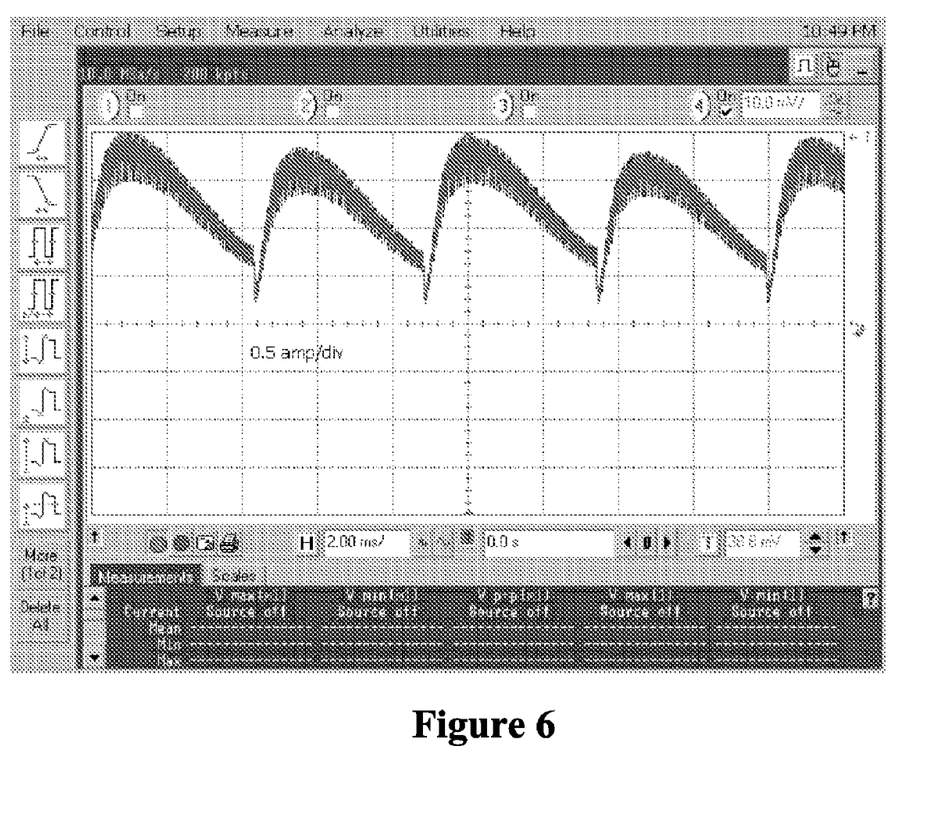
FIG. 6 illustrates a current drawn by a fan that does not include a boost regulator.
Figure 7:
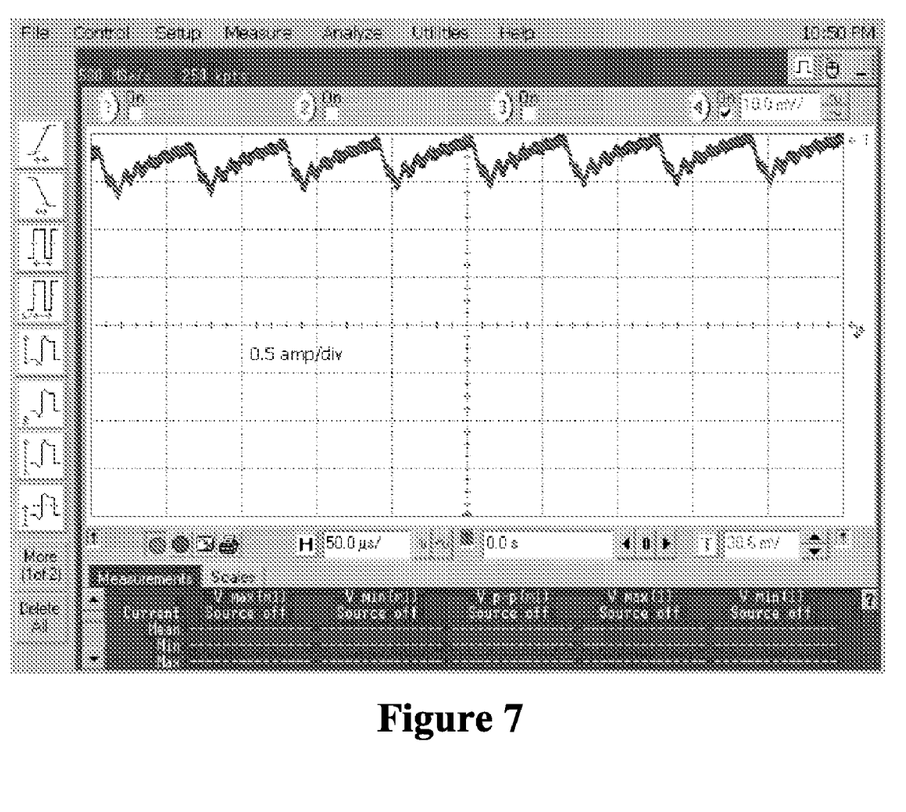
FIG. 7 illustrates an expanded view of the current drawn by the fan that does not include the boost regulator.

FIG. 6 illustrates a current drawn by a fan that does not include a boost regulator and FIG. 7 illustrates an expanded view of the current drawn by the fan that does not include the boost regulator. The output current shown in FIGS. 6 and 7 has a fundamental frequency of about 217 Hz, a high frequency component, and a peak-to-peak amplitude of about 1.8 amperes. The average of the current waveform is about 1.25 amperes. Details of the high frequency component of the waveform can be seen in the expanded view shown in FIG. 7. A psophometric meter has been used to measure a noise level of 5.1 mV in the output current waveform, which is significantly larger than the tolerance of 0.4 mV required for fans used in Plain Old Telephone Service (POTS) communication equipment.

Figure 8:
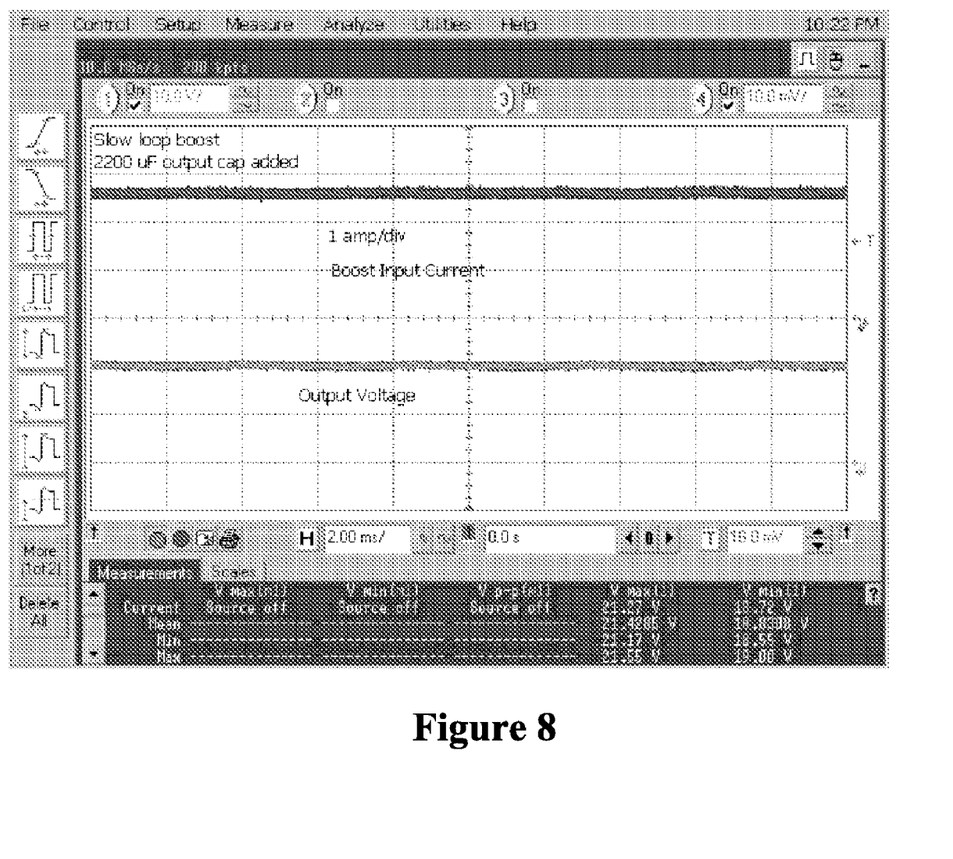
FIG. 8 illustrates an input current from a power supply and an output voltage provided to a fan by one embodiment of a boost regulator, in accordance with the present invention.

FIG. 8 illustrates an input current from a power supply and an output voltage provided to a fan by one embodiment of a boost regulator. The input current is from the power supply to an inductor in the boost regulator, e.g., from the power supply 115 to the inductor 125 shown in FIG. 1. Incorporating the boost regulator in the fan significantly improves the noise. The input current is measured at the input to a 12-to-20 volt boost regulator that is configured similarly to the second embodiment of the boost regulator discussed with regard to FIGS. 4 and 5. The boost regulator increases the output voltage and the input current to the boost regulator is proportionally higher than shown in FIG. 5. The average input current is 2.6 amperes and the alternating current ripple in the input current is barely visible at the 1 ampere/division scale used in FIG. 8. A psophometric meter measurement of the noise produced by the fluctuations in the input current indicates that the noise is approximately 47 µV, which easily meets the requirements for a POTS application. The improvement in the psophometric noise relative to embodiments of the fan that do not include a boost regulator configured to attenuate the fluctuations in the input current is a factor of approximately 100.

Figure 9:
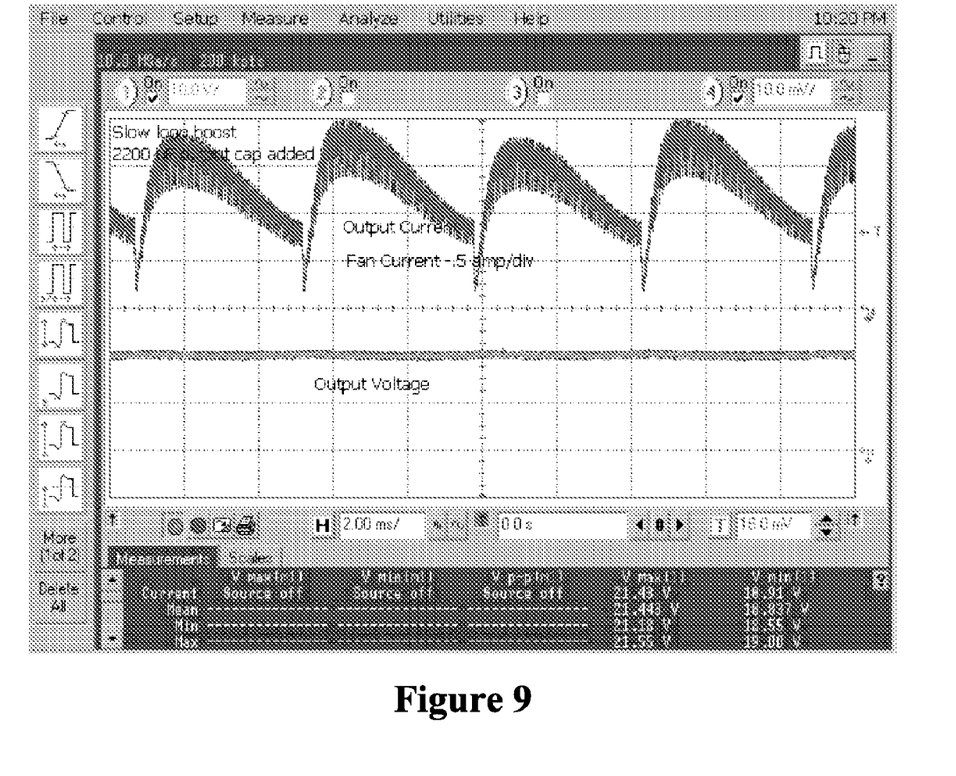
FIG. 9 illustrates an output current and the output voltage provided to the fan by the embodiment of the boost regulator shown in FIG. 8, in accordance with the present invention.

FIG. 9 illustrates an output current and the output voltage provided to the fan by the embodiment of the boost regulator used to produce the traces shown in FIG. 8. The fan continues to draw the same pulsating current as previously measured when the fan was directly powered by a 20 V supply (as shown in FIGS. 6 and 7). Thus, the improvement in the noise is a consequence of the presence of the boost regulator.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. An apparatus, comprising:
   a boost regulator configured to provide an output current to a fan motor using an input current provided at an input voltage by a power supply, the fan motor being configured to draw the output current at a first frequency, and the input current being constant within a first selected tolerance over a time scale longer than indicated by the first frequency.

2. The apparatus of claim 1, wherein the boost regulator comprises:
   an inductor in series between a first pole of the power supply and a first node;
   a diode coupled to the first node and in series with the inductor;
   a transistor having a drain coupled to the first node and a source coupled to a second node; and
   a capacitor coupled to the second node, the capacitor being in parallel with the transistor and in series with the diode.

3. The apparatus of claim 2, wherein the fan motor is coupled to the boost regulator in parallel with the capacitor.

4. The apparatus of claim 3, wherein the capacitance of the capacitor is selected based upon at least one physical parameter of the fan motor.

5. The apparatus of claim 4, wherein the capacitance of the capacitor is selected based upon at least one of a selected voltage across the capacitor, a speed of the fan motor, or a current draw of the fan motor.

6. The apparatus of claim 2, wherein the boost regulator comprises a circuit configured to provide a signal to a gate of the transistor at a second frequency.

7. The apparatus of claim 6, wherein the circuit is configured to provide a signal to the gate of the transistor at the second frequency, the second frequency being selected such that the input current is constant within the first selected tolerance over the time scale longer than indicated by the first frequency.

8. The apparatus of claim 7, wherein the circuit is configured to receive at least one feedback signal indicative of at least one of a voltage or a current in the boost regulator, and wherein the circuit is configured to select the second frequency based upon said at least one feedback signal.

9. The apparatus of claim 1, wherein the boost regulator is configured such that the output voltage is constant within a second selected tolerance over the time scale longer than indicated by the first frequency.

10. A method, comprising:
providing an output current to a fan motor using an input current provided at an input voltage, the fan motor being configured to draw the output current at a first frequency, and the input current being constant within a first selected tolerance over a time scale longer than indicated by the first frequency.

11. The method of claim 10, comprising providing the input current to a circuit comprising:
an inductor in series between a first pole of the power supply and a first node;
a diode coupled to the first node and in series with the inductor;
a transistor having a drain coupled to the first node and a source coupled to a second node; and
a capacitor coupled to the second node, the capacitor being in parallel with the transistor and in series with the diode.

12. The method of claim 11, comprising providing the output current to the fan motor, the fan motor being coupled in parallel with the capacitor.

13. The method of claim 12, wherein providing the output current comprises providing the output current using the capacitor, the capacitance of the capacitor being selected based upon at least one physical parameter of the fan motor.

14. The method of claim 13, wherein providing the output current comprises providing the output current using the capacitor having a capacitance selected based upon at least one of a selected voltage across the capacitor, a speed of the fan motor, or a current draw of the fan motor.

15. The method of claim 11, comprising providing a signal to a gate of the transistor at a second frequency.

16. The method of claim 15, wherein providing the signal to the gate of the transistor at the second frequency comprises providing the signal at a second frequency selected such that the input current is constant within the first selected tolerance over the time scale longer than indicated by the first frequency.

17. The method of claim 16, comprising receiving at least one feedback signal indicative of at least one of a voltage or a current in the boost regulator, and selecting the second frequency based upon said at least one feedback signal.

18. The method of claim 10, comprising providing the output current at an output voltage that is constant within a second selected tolerance over the time scale longer than indicated by the first frequency.

19. An apparatus, comprising:
means for providing an output current to a fan motor using an input current provided at an input voltage, the fan motor being configured to draw the output current at a first frequency, and the input current being constant within a first selected tolerance over a time scale longer than indicated by the first frequency.

20. A fan, comprising:
a power supply configured to provide an input current at an input voltage;
a fan motor configured to draw an output current at a first frequency, the output current being provided by the power supply; and
a boost regulator coupled between the power supply and the fan motor, the boost regulator being configured such that the input current is constant within a first selected tolerance over a time scale longer than indicated by the first frequency.

21. An apparatus, comprising:
a fan motor configured to draw a first input current at a first frequency; and
a boost regulator configured to draw a second input current that is substantially constant over a time scale longer than an inverse of the first frequency and to use the second input current to provide the first input current to the fan motor at the first frequency.

22. The apparatus of claim 21, comprising a power supply configured to provide the second input current to the boost regulator.

23. The apparatus of claim 22, wherein the boost regulator comprises:
an inductor in series between a first pole of the power supply and a first node;
a diode coupled to the first node and in series with the inductor;
a transistor having a drain coupled to the first node and a source coupled to a second node; and
a capacitor coupled to the second node, the capacitor being in parallel with the transistor and in series with the diode.

* * * * *